United States Patent [19]

Cole et al.

[11] Patent Number: 4,914,704
[45] Date of Patent: Apr. 3, 1990

[54] TEXT EDITOR FOR SPEECH INPUT

[75] Inventors: Alan G. Cole, Katonah; Robert H. Riekert, Ossining, both of N.Y.

[73] Assignee: International Business Machines Corporation, Armonk, N.Y.

[21] Appl. No.: 666,212

[22] Filed: Oct. 30, 1984

[51] Int. Cl.⁴ .............................................. G10L 7/08
[52] U.S. Cl. ...................................................... 381/43
[58] Field of Search ................................... 381/41–46, 381/48; 364/513.5, 419, 200 MS File, 900 MS File

[56] References Cited

U.S. PATENT DOCUMENTS

| | | | |
|---|---|---|---|
| 3,647,978 | 3/1972 | Hill | 179/15 A |
| 4,028,695 | 6/1977 | Saich | 340/365 R |
| 4,107,460 | 8/1978 | Grunza et al. | 179/1 SD |
| 4,355,302 | 10/1982 | Aldefeld et al. | 340/146.3 WD |
| 4,435,617 | 3/1984 | Griggs | 381/43 |
| 4,627,001 | 12/1986 | Stapleford et al. | 364/513.5 |

FOREIGN PATENT DOCUMENTS

| | | |
|---|---|---|
| 0114500 | 8/1984 | European Pat. Off. |
| 208282 | 3/1982 | United Kingdom |

OTHER PUBLICATIONS

Jones, "Building-Block Circuits Simplify Integration on Voice Output Systems", Computer Technology Review, Jan. 1983, pp. 63–67.
Tsuruta et al., "DP-100 Connected Speech Recognition System", Intelcon 79: Exposition Proceedings, Feb. 26–Mar. 2, 1979, pp. 48–52.
Martin, "One Way to Talk to Computers", IEEE Spectrum, May 1977, pp. 35–39.
Communications of the ACM, vol. 23, No. 12, Dec. 1980, pp. 676–687, ACM, N.Y., U.S.A., J. L. Peterson, "Computer Programs for Detecting & Correcting".
IBM Technical Disclosure Bulletin, vol. 27, No. 1A, Jun. 1984, p. 417, N.Y., U.S.A.; V. R. Base et al.: "Virtual Blank for Spelling Aid Programs".
Patent Abstracts of Japan, vol. 8, No. 89 (P-270) (1526), 24th Apr. 1984; & JP-A-59 3629 (Fujitsu K.K.) 10-0-1-1984.
Patent Abstracts of Japan, vol. 5, No. 185 (P-91) (857), 25th Nov. 1981; & JP-A-56 114 041 (Tokyo Shibaura Denki K.K.) 08-09-1981.
IEEE Trans on Information Theory, vol. IT-21, No. 3, May, 1975, pp. 250-256, "Design of a Linguistic Statistical Decoder for the Recognition of Continuous Speech", by F. Jelinek, L. R. Bahl, & R. L. Mercer.
ICASSP International Conf., Boston, Apr. 1983, pp. 1065-1067, "Recognition of Isolated-Word Sentences from a 5000-Word Volcabulary Office Correspondence Task", by L. Bahl et al.

Primary Examiner—Gary V. Harkcom
Assistant Examiner—John A. Merecki
Attorney, Agent, or Firm—Marc D. Schechter

[57] ABSTRACT

A text editor is connected to a speech recognizing unit for editing preferably spoken input text using a display screen. For each text word (including digits), and each punctuation mark that can be recognized and is contained in a dictionary, a token is stored for holding information on character count, capitalization, left and right concatenation of the respective item, and for providing fields for context conditions. For each segment or entity recognized spoken text, a respective character string and associated token is transferred to storage in the editor to allow automatic formatting and correct displaying or printing of the text, including spaces and capitalization where required. Tokens are updated during editing to reflect modifications such as in the beginning of a sentence or in concatenation. Switching to spelling mode is provided for entering single spelled characters in case where a word cannot be recognized or where spelling is desired.

22 Claims, 9 Drawing Sheets

SYSTEM OVERVIEW

NORMAL TEXT WORD

SPACE

OPEN PAREN./
OPEN QUOTE

PUNCTUATION MARK /
CLOSE PAREN./CLOSE QUOTE

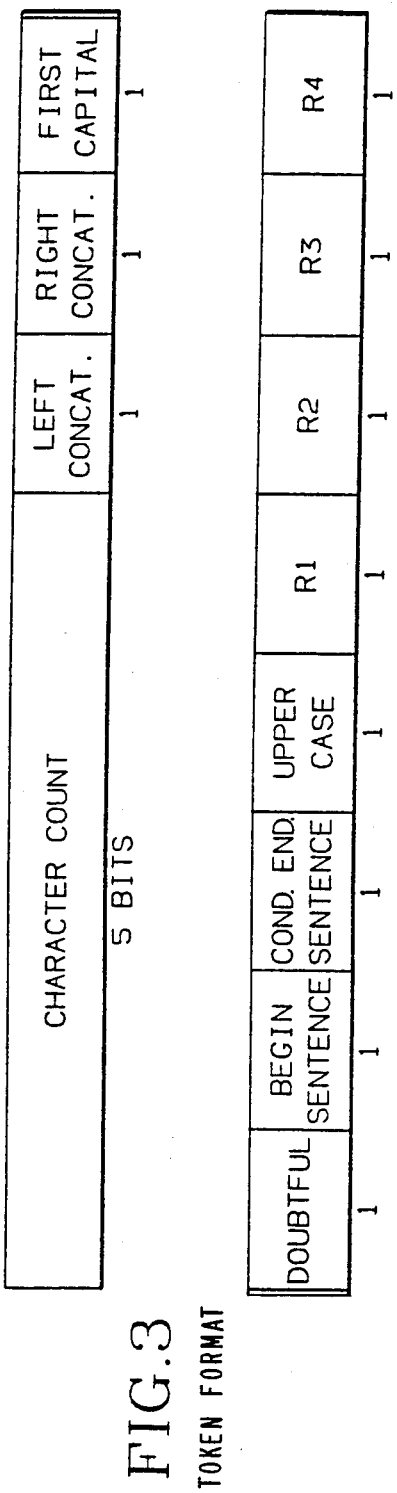

FUNCTION (CONTROL) KEYBOARD

\* ALSO AVAILABLE AS SPOKEN COMMANDS
F1....F4: OPTIONAL FUNCTIONS (RESERVE)

MANUAL SELECTOR
(POINTER DEVICE)

F5: OPTIONAL FUNCTION (CALL MENU)

WORKING STORAGE

LINE STRING STORAGE

TOKEN LIST STORAGE

CHAINED LISTS

LINE POINTER REGISTER

LINE POINTER

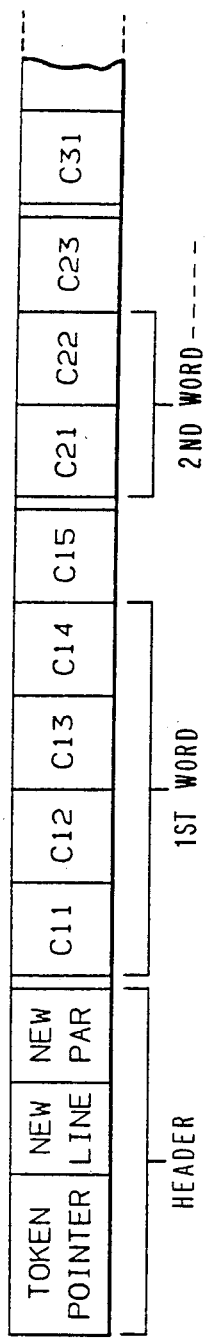
FIG.7D LINE STRING BUFFER
FIG.7E TOKEN POINTER REGISTER
FIG.7F CURSOR REGISTER

WORDS/TOKENS

EDITING CONTROL

CHARACTER PROCESSING
(SPELLMODE)

TEXT EDITOR FOR SPEECH INPUT

REFERENCE TO MICROFICHE APPENDIX

Reference is herein made to an appendix of one microfiche having 33 frames including a test frame and invention identifier frame.

FIELD OF THE INVENTION

The present invention relates generally to text recognition in general, and speech recognition in particular. In its preferred form, the invention is directed to a speech editing system in which spoken words after recognition are displayed and can be edited using a voice input or user-controlled manual input.

BACKGROUND OF THE INVENTION

Computer-controlled editing systems are well known. As input means, they usually have keyboards, and the information or text to be edited is entered by sequential keystrokes. Commands and other control information are also usually entered by keys. However, other devices for entering control information are also known, including touch-screens, joysticks, so-called mice, graphic tablets, etc.

Once the information is stored, it can be displayed and then edited by inserting additional characters, by replacing characters, or by deleting characters. Whole text sections can also be moved or deleted when suitably identified.

A cursor for highlighting a particular character on the display screen is a standard feature in most editing systems. It marks the location where insertion, replacement, or deletion takes place. Because editing is effected on a character basis—except for the movement or deletion of whole sections—the cursor is also usually valid for a single character position, and its basic movement is one character position to right or left.

Some word processing systems are known in which a misspelling check can be made word by word, then highlighting a full word that was found to be incorrect or unknown. However, control of such movements and highlighting requires delimiters between the words (such as spaces) which must also be entered by keystrokes of the operator. Only a few basic editing operations (such as deletion) are provided for entire words in some word processing systems, but most editing operations (such as input and insertion) are still done character by character.

There is a demand for other techniques than character keystrokes for entering text into a processing system and for editing such text. That is, not all people are familiar with operating keyboards, and many people do not like working on a keyboard. Furthermore, keyboard operation is time consuming. The usual way for doing correspondence is that one person dictates a letter or report and another person, i.e. a secretary, listens to the recorded speech and transcribes it using a typewriter keyboard. It is, therefore, desirable to introduce speech-controlled text input and editing.

A number of speech recognition systems were described in the literature or in patents such as in the articles "Recognition of Isolated-Word Sentences from a 5000-Word Vocabulary Office Correspondence Task" by L. Bahl et al., Proceedings of the 1983 International Conference on Acoustics, Speech and Signal Processing (Boston April 1983), pp. 1065-1067; "Design of a Linguistic Statistical Decoder for the Recognition of Continuous Speech" by F. Jelinek et al, Transactions on Information Theory, Vol. 21, No. 3, May 1975, pp. 250–256; and U. S. Pat. Nos. 4,181,821 and 4,277,644.

Most of the known systems recognize only separately spoken words, but some have been designed for distinguishing and identifying words with continuous speech input. Speech recognition systems have been used or suggested for certain applications such as the direct control of machines by a limited set of spoken commands, input of numerical values into computing systems, ordering of goods from supply centers, directory lookup, or for verifying a speaker's identity, but have not included immediate display and editing.

Moreover, speech recognition systems have not been employed with editing that may be initiated by a voice input or a manual input such as the conventional keyboard input.

DISCLOSURE OF THE INVENTION

It is therefore an object of the invention to devise an editing system into which information is entered preferably, in spoken form.

Another object is to provide a speech-input editing system that allows immediate display of the entered text in standard form, i.e. with spacing between words being automatically entered and with correct capitalization at the beginning of a sentence.

Another object is to provide a method of editing spoken input text in such a way that spoken punctuation is correctly concatenated or spaced with respect to speech-recognized words in sentences.

A further object of the invention is a speech-input editing system which, though normally operating on a full-word basis, easily allows switching to single-character spelling mode if desired.

These and other objects and advantages are achieved by a speech recognition and speech-input editing system and method as defined in the claims, which, in particular, provide a token in connection with each recognized spoken entity such as a word or punctuation mark, said tokens containing information that is required for correct formatting of the spoken text for display or printing. These tokens are stored and can be updated when the context changes during editing, e.g. when two words are merged or when the first word of a sentence is deleted. Concatenation information provided in the tokens allows for automatic insertion of spaces between words, or concatenation of punctuation marks with words in the correct and usual form, without requiring further input of control information than just the clear speaking of words and punctuation marks.

An editor system, according to the invention, can accept speech input in a form that is now typical for dictating correspondence, and provides text in a final formatted form that can be seen (or heard, where speech synthesis is employed) by the speaker or other user. The system also allows fast and easy modification of words that were not properly recognized, or of a text output that was not intended.

It should be noted that the invention may also be applied to text recognition systems which have other than speech input. For example, the teachings of the invention may be applied to a keyboard input system, wherein the text is entered without keying in spaces between successive words. The present invention therein provides concatenation information in the form of tokens as with speech input. That is, words typed continuously without spacing are recognized in a recognizing unit and are presented as code identifiers to a lookup memory which assigns tokens including concatenation indicia thereto. If desired, capitalization character count, and other information are included in the tokens as with speech input. It is of course, preferred, however, that the invention be provided with speech input—the invention, in such case, also requiring provision for voice command and punctuation inputs.

The invention and its advantages will become more apparent from the following description of a preferred embodiment and from the drawings.

BRIEF DESCRIPTION OF THE DRAWINGS

FIG. 3 shows the token format providing character count, concatenation indication, and other control information;

FIG. 4 shows the character string format for words;

DETAILED DESCRIPTION

(A) PRINCIPLES AND ELEMENTS OF SYSTEM (1) System Overview

The system which is described in the following section recognizes spoken input text and spoken commands, and displays on a screen the input text in accordance with system rules and with the given commands. Command input by a keyboard and other manual devices is also provided. The text existing on the screen (or in buffer storage, respectively) can be edited by additional commands and by entering additional spoken words or characters.

Figure 1:
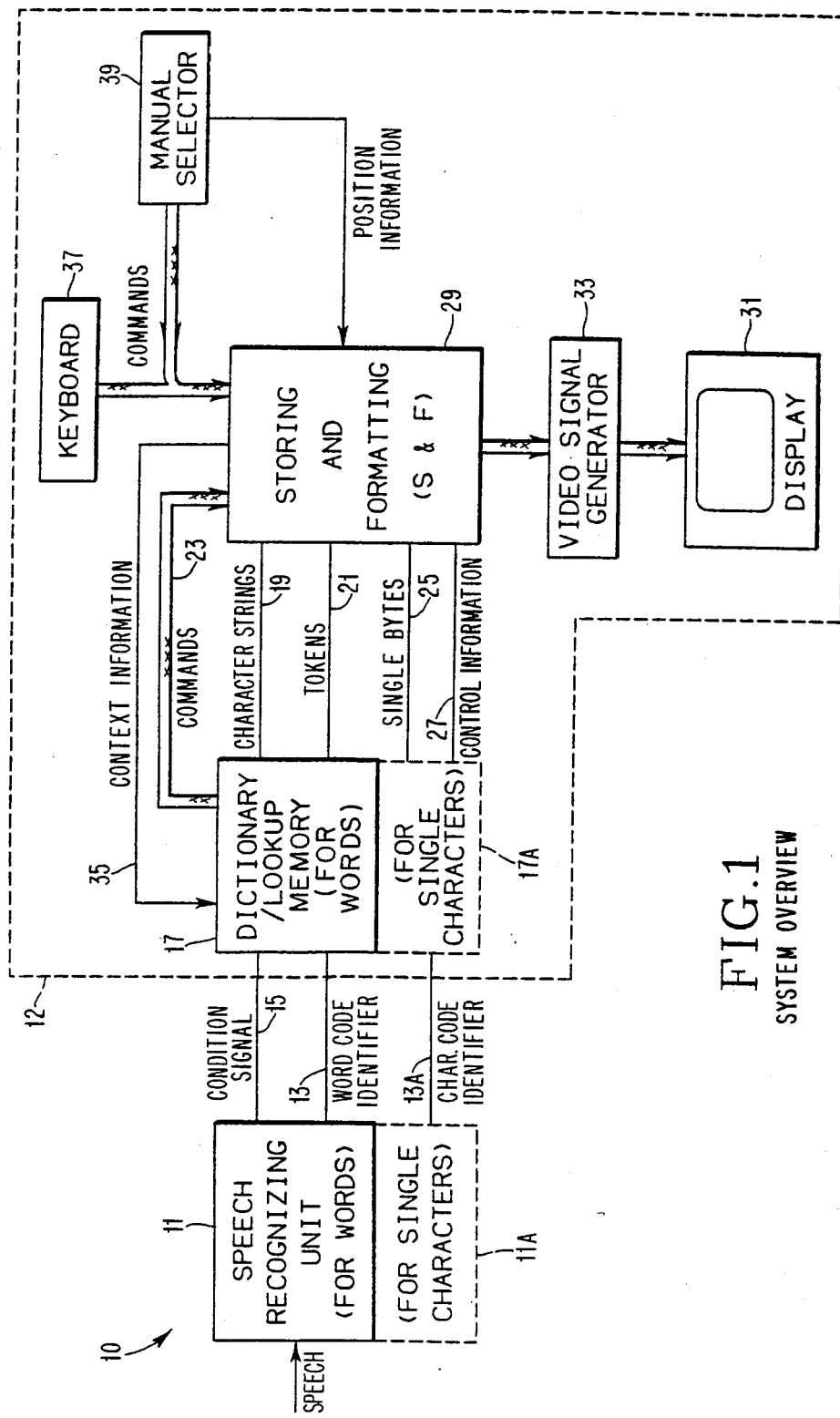
FIG. 1 is a block diagram of a speech-input editing system employing the invention.
Figure 2A:
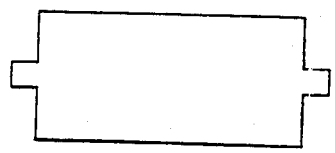
FIGS. 2A, 2B, 2C, and 2D are schematic representations of the different types of concatenation occurring in text editing, which are indicated in the tokens.
Figure 2B:
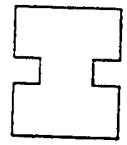
Figure 2C:
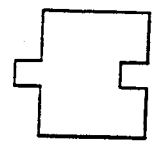
Figure 2D:
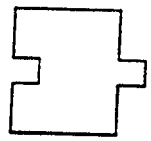

FIG. 1 is a block diagram of a speech input and editing system 10 in which the present invention is used. A speech recognizing device 11 receives at its input, a signal representing speech, which may be either separately spoken words, commands, or individual characters (when spelling), or even continuous speech. Each word of a given language vocabulary, each individual character (letter, digit, punctuation mark, etc.), and each command word of a given command list is represented by a code identifier from a given set of code identifiers. Each text word, punctuation word, and command word is hereafter referred to as an "entity". The code identifiers may consist of n bits, e.g. 16 bits, thereby distinguishing $2^n$ e.g. more than 64,000, different entities.

When spoken input is recognized as a word, speech recognizing unit 11 furnishes a recognition code identifier at its output 13. At another output 15 of the speech recognizing unit 11, a condition signal is issued simultaneously which indicates whether the recognition was successful (definite recognition), doubtful (probably erroneous recognition result, output is best possible choice), or whether no recognition was possible at all. In the last case, a respective "empty" code word (asterisks) will be issued at output 13. The three possible conditions may be represented by a bit pair on output 15. A possible alternative would be to provide, instead of the discrete signal for three particular cases, a probability value indicating the likelihood that the recognition is correct.

A list of available commands for spoken input is given in table 1, and a list of the possible punctuation marks and their pronunciation is given in table 2.

As was mentioned earlier, speech recognizing unit 11 is not part of the editor 12 of the invention. It is however, the preferred input device for the full-screen editor 12 which is represented by the other blocks and interconnections of FIG. 1. A single word speech recognizing unit which may be used as device 11 is described in the above mentioned article by Bahl et al. and in the above mentioned U.S. Patents.

Usually, such devices recognize complete words (i.e., vocabulary words or commands) and represent each word by an identifier such as a number or label corresponding to the word. For the present system, the recognition of spoken punctuation marks and digits is also provided. Facilities for recognizing separately spelled characters may be added as portion 11A to the basic speech recognizer to allow entry of words not within the recognition vocabulary. A recognized character would then be indicated on character code output 13A by a respective code identifier.

The editor system comprises a dictionary/lookup memory unit 17 which receives from the speech recognizing device 11 the code identifiers representing words, punctuations, or commands and the respective condition indications. In response to each code identifier representing a text word, a dictionary portion of unit issues at an output 19 a recognition code in the form of a character string of the respective text word. The recognition code may be in ASCII, EBCDIC, or other character-representing code. Preferably, each character string represents the ASCII code for a given letter, number, or punctuation mark. Simultaneously, a "token" comprising the character count of the text word and other word text information is issued by a lookup memory portion at an output 21. The dictionary/lookup memory 17 preferably comprises random access memory although read-only memory may also be employed. More details of the token will be given in a later section.

In response to each spoken editing command input, the dictionary portion issues a respective coded command word on output 23. More details about commands and their command word representation will also be given in a later section.

An additional dictionary section 17A would be provided for single characters. It receives, at its input, an identifier code for each recognized spelled character and issues in response thereto one single code word at an output 25, and simultaneously some further control information related to the individual character at an output 27. More details on this control information will also be given in a later section.

A storing and formatting section 29, receives all the information from outputs 19 through 27 and processes it for preparing the video information, i.e. the correctly formatted information to be shown on a display screen 31. A video signal generator 33 is provided for converting the coded video information into the actual electrical control signals for the display.

The storing and formatting section 29 also determines the context status of the edited file, depending on the text words, punctuation marks, and commands it receives. The status may, for example, be: "beginning of sentence", "spellmode" or the like. A listing of the different possible statuses is given in table 3. A coded representation of the status is returned on line 35 to dictionary/lookup 17 so that the latter can update the tokens it issued based on the present status (e.g. setting the "beginning of sentence" bit in the next token to 1). The respective updating procedure will be explained in a later section.

Some additional input devices are optionally provided for the storing and formatting section 29. A keyboard 37 enters commands (and possibly characters) into the editing system as mentioned above, and a manual selector or pointing device 39 such as a light pen, a graphic tablet, a "mouse" or any similar apparatus may also be used in editing. These additional known devices would be useful for giving commands in other than spoken form, and for providing a pointing function for entering location information or for moving a cursor other than by keystrokes.

(2) Concatenation and Blank Insertion

An important feature of the present editing system is that it handles text words as entities, i.e. it usually adds whole words to the display, and automatically inserts blanks between words. Furthermore, the cursor which marks the position of interest or activity is valid usually for a whole word, or jumps by a whole word if it is moved. The cursor width is automatically adjusted to word length. This simplifies operation because the speech recognition system recognizes and issues whole words.

However, as was mentioned above and will be explained in more detail below, the present system also provides an operating mode that handles only single characters, when it is necessary to spell a word that was not recognized. When such characters are added to the display, no blanks should be automatically provided therebetween (as is done for words) except that the first and last character of a word each has a blank appended thereto. Also, the cursor marks only the single character, and moves forward or backward only by single character increments in this mode.

The spoken punctuation marks when displayed are handled in a special manner. A colon, for example, follows after a word without a blank, but itself is followed by a blank. The same is true for an end parenthesis, but the contrary condition holds for a beginning parenthesis (a blank in front of it, but no blank after it).

The different conditions for concatenation or inserting blanks are illustrated in FIG. 2. A normal word needs a blank in front of it and after it, as indicated (A) by the two projections at the ends of the word symbol. A blank (B), in contrast, can be directly concatenated to either end of a word, but never to another blank, as shown by the two indents at the ends of the blank symbol. An opening parenthesis (C) or similar symbol (e.g. start quotation) requires a blank before it but is concatenated to the word following it. A punctuation mark like a colon, period, question mark, etc. (D) and a right parenthesis or similar symbol (e.g. end quotation), is concatenated to the word preceding it but requires a blank after it, as indicated by the left indent and right projection of the respective symbol in FIG. 2. The blank insertions and concatenations are effected automatically by the present full-screen editor.

Notation used for the four categories in this description is as follows: LR for left and right blank; LO for blank at left but concatenation at right; OR for concatenation at left and blank at right; and OO for concatenation at both sides. An "X" indicates that blank insertion or concatenation is context-dependent (e.g. for digits) and cannot be determined in advance.

A common stylistic convention is to end each sentence with two spaces; this style may be optionally supported by the editing system. FIG. 2 illustrates the style in which each sentence is ended by a single space.

(3) The Token

For each recognized entity corresponding to a text word, digit, or punctuation mark but not commands and single-spelled characters, the editor provides a "token". The token indicates the character count for the respective entity as well as its concatenation conditions and other control information which is important for editing the display. The token format is shown in FIG. 3. The character count consists of, for example, five bits if a maximum word length of 32 characters is assumed. Any other number of bits could be provided in this field if desired. For each digit and for punctuation marks the character count is, of course, equal to one.

The next two 1-bit fields indicate whether the respective entity is to be concatenated to the preceding or following entity, respectively. For normal words, both bits would be zero because normal words are not concatenated at either end. The next field is also one bit only and indicates whether the first letter of the word is always to be capitalized (like in "John" and "English").

The eight bits discussed so far, i.e., those up to the double field line, constitute the control information which can be predetermined for each entity (word, punctuation mark, digit, etc.). However, that token has fields for more control information which is entered during the formatting and editing process. The respective control bits are explained below.

The first variable control bit indicates whether the respective entity was not clearly recognized, i.e. whether its selection is doubtful. The next control bit field holds an indication whether the respective word stands at the beginning of a sentence and, thus, must be capitalized (first letter). The third variable control bit indicates whether the respective entity is a conditional end of sentence (e.g. a punctuation mark like a quotation mark (") which usually does not mark an end of sentence but in certain cases does). The next variable control bit indicates whether the respective word must be capitalized in all its letters independent of context (this condition is entered by the UPPERCASE command). The remaining four variable control bits (R1, R2, R3, R4) are provided as reserved, i.e. they can be assigned any meaning in a specific system.

The 8 bits in the variable control information field are determined, as was mentioned already, based on given commands or from context during the editing process. How this is done will be explained in a later section.

In FIG. 4 there is shown the format of the character string for words as they are stored in the dictionary. Each word consists of N Characters C1 . . . CN, each of which is represented by 8 bits (1 byte). Word length is variable with a maximum of 32 characters. Single characters in the dictionary portions of 17A (spellmode operation) consist of one byte only. The first character of each word may be marked, for example, by setting a bit not used for character identification.

(4) Survey of Spoken Commands

The present editor system has different editing modes of operation. Switching between different modes is effected by commands. There are further commands which are effective only for the next action. The various commands which affect the modes or operating statuses of the system are shown in Table 1 and will be explained below.

It is also assumed that the system has a cursor which indicates the current word or character. As the cursor is usually valid for a whole word in the present system, it will be referred to hereafter as "cursor box" or "current box". In the case of single characters or punctuation marks, the box is, if course, only a single character in length.

The first command "INSERT" starts the insert mode in which spoken information is inserted before the cursor box. During current input, the cursor will be always at the end of the existing text, so that new input is appended at the end. If the editing person wants to insert some missing information, he can move the cursor to the respective position (as usual in editing systems), and then speak the correction which will then be inserted within the existing text, with automatic shifting of the text following the insertion spot to make room for the new text.

The second command "REPLACE" starts replace mode in which spoken words or characters overwrite existing words or characters. Replacement starts, of course, at the current cursor position. Thus, if three words are spoken in replace mode, they will replace three consecutive words, and the cursor box moves after each replacement to the next consecutive word. The same is true for individual characters (as is well-known in editing systems).

The third command "DELETE" deletes the whole word or an individual character (depending on current mode) at the current cursor position.

Command number 4 "NEWPARAGRAPH" starts a new paragraph at the current box location. Execution of this command results in the starting of a new line and marking its header as new paragraph (explained later).

Command number 5 "NEWLINE" forces a new output line at the current box location. A new line will be started and a respective entry will also be made in the line string header involved (as indicated above for a new paragraph).

The sixth command "CAPITAL" indicates that the next letter or word spoken is to be capitalized (first letter only). The respective control bit in the token involved will be set accordingly.

The seventh command "UPPERCASE" indicates that the next word spoken or spelled is to be converted entirely to uppercase (all letters). The uppercase control bit in the respective token is adjusted accordingly.

Command number 8 "SPELLMODE" starts the spelling mode in which only individual characters are legal. Normal vocabulary words will not be recognized or accepted in this mode.

Command number 9 "ENDSPELLMODE" ends the spelling mode and returns to the normal mode in which only words of the normal vocabulary of several thousand words (plus commands, punctuation marks, and digits) are recognized and accepted.

As was indicated above, these commands could also be given via input keys of the keyboard 35 shown in FIG. 1 and in FIG. 6 explained below. The effect on system operation would be the same as for the spoken commands.

(5) Survey of Spoken Punctuation

Table 2 gives a list of the punctuation symbols (including digits) that can be entered in speech form. The spoken form as shown at the right of each possible symbol is self-explanatory. In Table 2, there is also shown for each punctuation symbol, the concatenation category to which it belongs. Reference is made also to FIG. 2 where the four possible concatenation categories A through D are illustrated schematically.

It should be noted that in a basic form of the editing system the words used for punctuation and digits (and also the words used for commands) must not be used as normal text words, to avoid wrong commands and punctuation. However, there are several ways to solve this problem so that punctuation and command words can also be used within normal spoken text:

(a) The language model used for the speech recognition process can be so refined that it can distinguish, using context, whether a word is normal text or punctuation.

(b) The spoken words for punctuation and digits (as well as for commands) could be made uniquely distinguishable by a prefix, e.g. PUN-colon, PUN-question mark, DIG-five, DIG-zero, etc.

(c) It would also be possible to switch to SPELL-MODE prior to uttering the words representing punctuation, digits, commands, etc. In this case, words as "period" or "five" would be entered into both dictionary sections 17 and 17A but with different meanings.

(6) Keys of Keyboard and Manual Input Device

Figure 5:
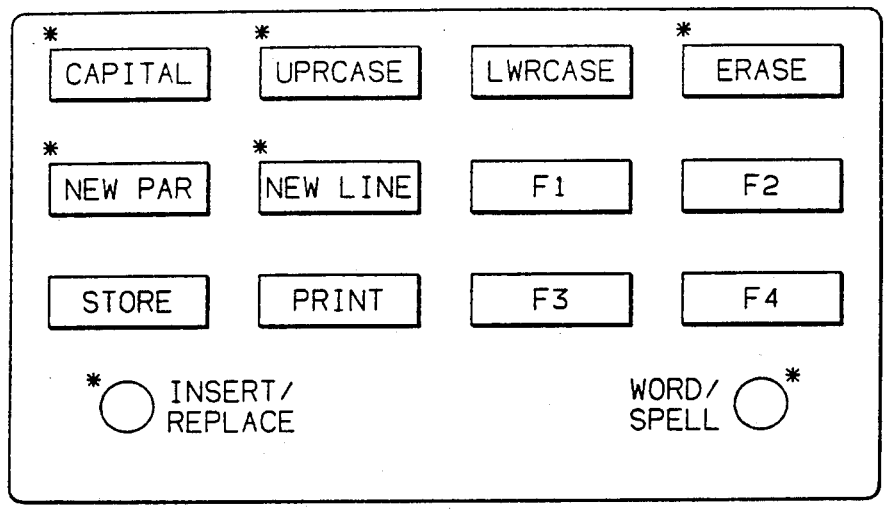
FIG. 5 represents the control portion of a keyboard that can be used for entering commands, most of which can also be entered in spoken form.

Keyboard 37 preferably includes a normal character section like any typewriter, but it has also a control key section which is shown in FIG. 5. It includes, preferably, keys for the nine commands which were already explained as spoken commands in section 4 above. For each of the command pairs INSERT/REPLACE and SPELLMODE/ENDSPELLMODE, a single toggle switch is provided on the keyboard. In addition, keys for three further commands are provided: LOWERCASE for converting a whole word from uppercase to lowercase, STORE for transferring screen contents to storage, and PRINT for transferring screen contents to printer output. A few more keys F1 through F4 are shown which can be used for additional commands if required.

Figure 6:
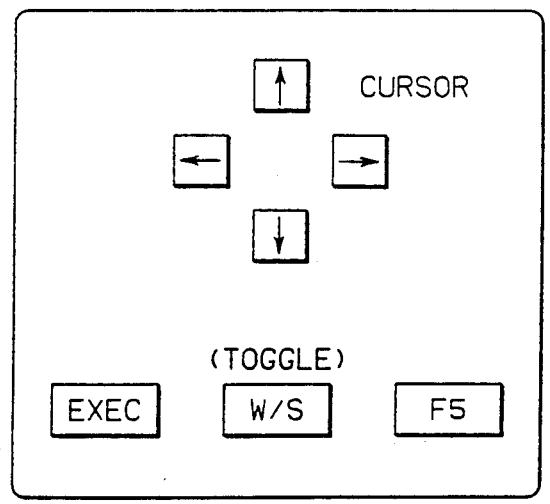
FIG. 6 represents the keys of a manual selector for the cursor position and also for entering some basic commands.

The manual selector or pointing device 39 is shown in FIG. 6. It has four keys for moving the cursor in the four coordinate directions. Instead of the four cursor keys, a joystick could be provided. Another possibility would be to have position-sensing means at the bottom surface so that the manual selector can be used as a "mouse". Three further keys are provided: one is a toggle switch for alternating between SPELLMODE and WORDMODE (=ENDSPELLMODE). Another key is used for the function EXECUTE which means that a command already entered (i.e. preselected) in spoken form or by actuating a key, should now actually be executed. Any command when entered (preselected) will be shown on the screen so that the operator can check it before it is actually performed (by touching the EXECUTE key). The last key F5 is a reserve and can be assigned, for example, to the function of calling a selection menu to the screen.

(B) STORAGE OF INFORMATION (1) Arrangement in Dictionary

As was mentioned above already, for each entity—except spelled characters—that can be recognized by the speech recognizing device (i.e. words, single digits, punctuation marks), there is stored in dictionary portion 17 a character string and an associated token. The formats were explained in section (A)3 already. Whenever a code identifier is furnished over line 13 to the dictionary section, it issues the character string and the token for the respective entity at its output. In the preferred embodiment, the string and token are communicated in parallel and simultaneously. For single characters in SPELLMODE only a single respective byte is stored in, and furnished by, dictionary section 17A. The dictionary also stores a string of five asterisks (*****) plus token, and a single asterisk (*). These are issued when a spoken entity cannot be recognized in either wordmode or spellmode, respectively.

(2) Arrangement of Active Information in Working Storage

Figure 7:
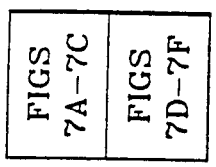
FIG 7 is a block diagram of major portions of the working storage in the storing and formatting section of FIG.,1.
Figure 7A:
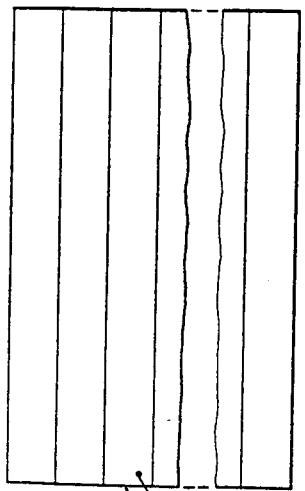
Figure 7B:
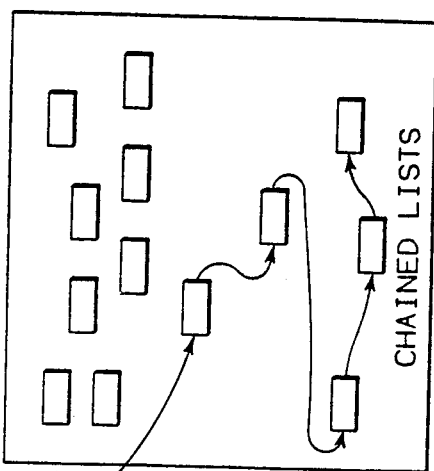
Figure 7C:

The contents of an edited file (of which all or a portion is shown on the screen) are kept in working storage which, in the present system, is comprised of a storing and formatting section 29. The particular way in which the character strings and their associated tokens are stored in the working store of present system is illustrated in FIG. 7.

There is a line string storage element (71), which holds for each line of the presently edited file or document the respective character string as a separate item. The line character string is a concatenation of word character strings. For each word character string in the line string storage (71), there is an associated token stored separately in the token list storage 72. The tokens are arranged in a chained list structure, as will be explained below.

When a particular line is being edited, when the cursor is positioned thereat on the screen, a pointer identifying the line is loaded into an active line pointer register (7C). The character string for the respective line is loaded into a line string buffer (7D).

In FIG. 7D, there is shown the line string format for a subject line. The line string is preceded by a header which comprises three fields: a token pointer which identifies the storage location, in token storage 72, of the token that is associated with the first word in the active line. The other two fields of the header are single bits indicating whether a new line or a new paragraph starts with the subject line. The remainder of the line string comprises the word strings of all the words making up the line plus blanks, e.g., word W1 consisting of characters C11, C12, C13, C14; blank C15, word W2 consisting of characters C21, C22; blank C23; etc. Boundaries between different words can be recognized by the mark(*) which is entered into the first character of each word when it is transferred into working storage.

FIG. 7E shows a token pointer register which contains a pointer to the token of the presently active word, i.e., the one having the cursor. As was mentioned already, the tokens of all the words available in the line string storage, are separately stored in the token list storage (72), in chained list form. The address of the first token of the set of tokens belonging to a line string is given in the header of the line string (cf. FIG. 7D). This first token has appended to it in storage (72), the address of the second token (i.e. the token belonging to the second word of the line), and so on. The last token of a line has appended to it a respective end indication. The token pointer register shown in FIG. 7E thus holds a pointer to the actual token (corresponding in format to FIG. 3) which is stored (together with the address of its follower) in token list storage (72).

If now a line string is moved from the line string storage into the line string buffer when it is activated, the pointer to the first token (identified in the line string header), is moved from the line string buffer (7D) into the token pointer register. When the cursor moves from word to word during editing of the line, one token pointer after the other is transferred to the token pointer register, using the "follower" addresses (i.e. the next token pointer). If any change in status of a word occurs during editing (e.g. a word moves into the first position of a sentence), the respective token can be updated as it is easily accessible in the token list storage, using the actual token pointer.

An additional register in the working storage is the cursor register shown in FIG. 7F. It holds the address of the start position of the presently active word in the line string buffer (e.g., 7 bits for identifying one of 128 characters in the line) plus a length indication of, preferably, 5 bits which is taken from the token and identifies the length of the presently active word and of the cursor. When the cursor is moved, the system looks for the next marked starting character in the line string buffer and enters its position into the cursor register. In addition, the next token pointer is fetched to the token pointer register (using the follower address), and the length indication is copied from the newly active token into the second portion of the cursor register.

(C) OPERATION OF THE EDITING SYSTEM (1) Example for Demonstration

Figure 8:
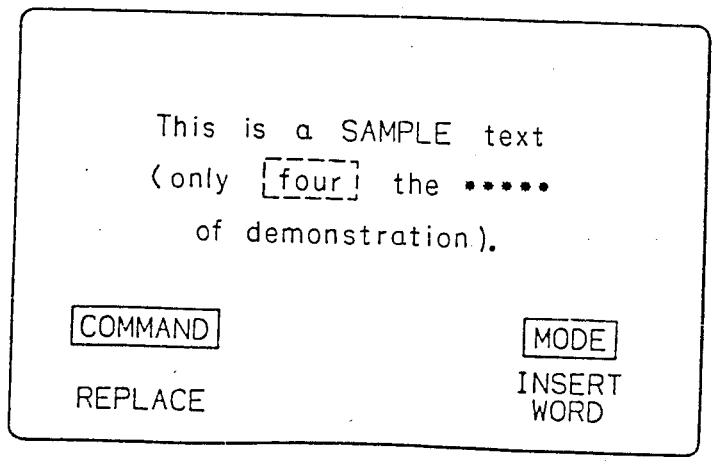
FIG. 8 shows a display screen with a sample sentence for explaining various features of the speech-input editor.

To illustrate the operation of the editing system, an example is shown in FIG. 8. FIG. 8 represents a screen on which a sentence just entered is displayed. The desired sentence is "This is a SAMPLE text (only for the purpose of demonstration)." The spoken sequence for entering this sentence was "this is a UPPERCASE sample text OPEN-PAREN only for the purpose of demonstration CLOSE-PAREN PERIOD". The words shown in uppercase in the spoken sequence are commands or punctuation marks.

As can be seen in FIG. 8, the uppercase command was executed correctly because the word "sample" is displayed in capital letters. The word "for" was incorrectly recognized as "four", but the system noticed that the recognition was doubtful and therefore this word is marked by a frame so that the editing person is aware of the situation and can check the spelling. The word "purpose" was not recognized at all. Therefore, the system entered a sequence of five asterisks. The example further shows that the system correctly provided spaces between text words but no space after the opening parenthesis and no space before the closing parenthesis and the period.

After the whole sentence is entered and the cursor follows the period as the last entered entity, the user may wish to replace "demonstration" with "illustration". To do so, the cursor is moved three entities back to thereby point to the word "demonstration". The command REPLACE is invoked by speech (or keyboard entry), resulting in the word "demonstration" being marked. The last given command REPLACE is shown in the lower left corner of the screen. However, to actually execute it, the operator must activate the EXECUTE key, as was mentioned earlier. In the right hand corner, the presently valid status of the system is shown, i.e., INSERT (for entering new text—the command REPLACE is not yet effective) and WORD (usual mode if no spelling is required).

With reference to the example of FIG. 8, the different operations that are executed for entering and editing a sentence will be described.

(2) Procedures for Editing

The procedures or operations which are executed in the editing system will now be explained in more detail, and reference is made to FIG. 1 and to the flowcharts shown in FIGS. 9A-9C.

(2a) Basic Procedure (FIG. 1)

The procedure that is executed for each word or command which is entered comprises the following steps:

Transfer code identifier for recognized entity from speech recognizing device 11 to dictionary/lookup memory 17.

Readout character string and associated token, and update token according to available context information
OR
Readout command code word
Transfer character string and token to storing and formatting section (S&F) 29
OR
Transfer command code word to S&F section 29
OR
Transfer command from keyboard 37 or manual selector 39 to S&F section 29.
OR
Transfer cursor positioning information from manual selector 39 to S&F section 29.

Evaluate new context information and update stored context information in S&F section 29, and return part of new context information to dictionary/lookup memory 17.

Insert character string and token into storage of S&F section 29.

Update cursor position and length.
Update token information.
Update display on screen 31 from new and updated information in S&F section 29.

(2b) Detailed Procedure for Updating of Token in Dictionary/Lookup Memory 17

The dictionary/lookup memory 17 receives the following information for updating of the token it issues:

From the speech recognizing device 11: "Word is probably correct", "word is doubtful (probably incorrect)", or "word is not recognized" along condition signal line 15, the latter of which causes use of the dummy word string "*****".

From the S&F section 29: "Beginning of sentence, next text word to be capitalized"—"Last entity was a digit, next entity if a digit is to be left concatenated"—"- Last command was UPPERCASE, next text word to be all uppercase" (for the list of context conditions that are transferred to the dictionary/lookup memory 17 from S&F section 29, see Table (3).

The dictionary/lookup memory 17 determines whether the issued entity is a text word or a digit, and sets in accordance with the received token updating information the respective control bits (doubtful—begin sentence —left concatenation—uppercase) to "1" before it transfers the token to the S&F section 29.

Figure 9A:
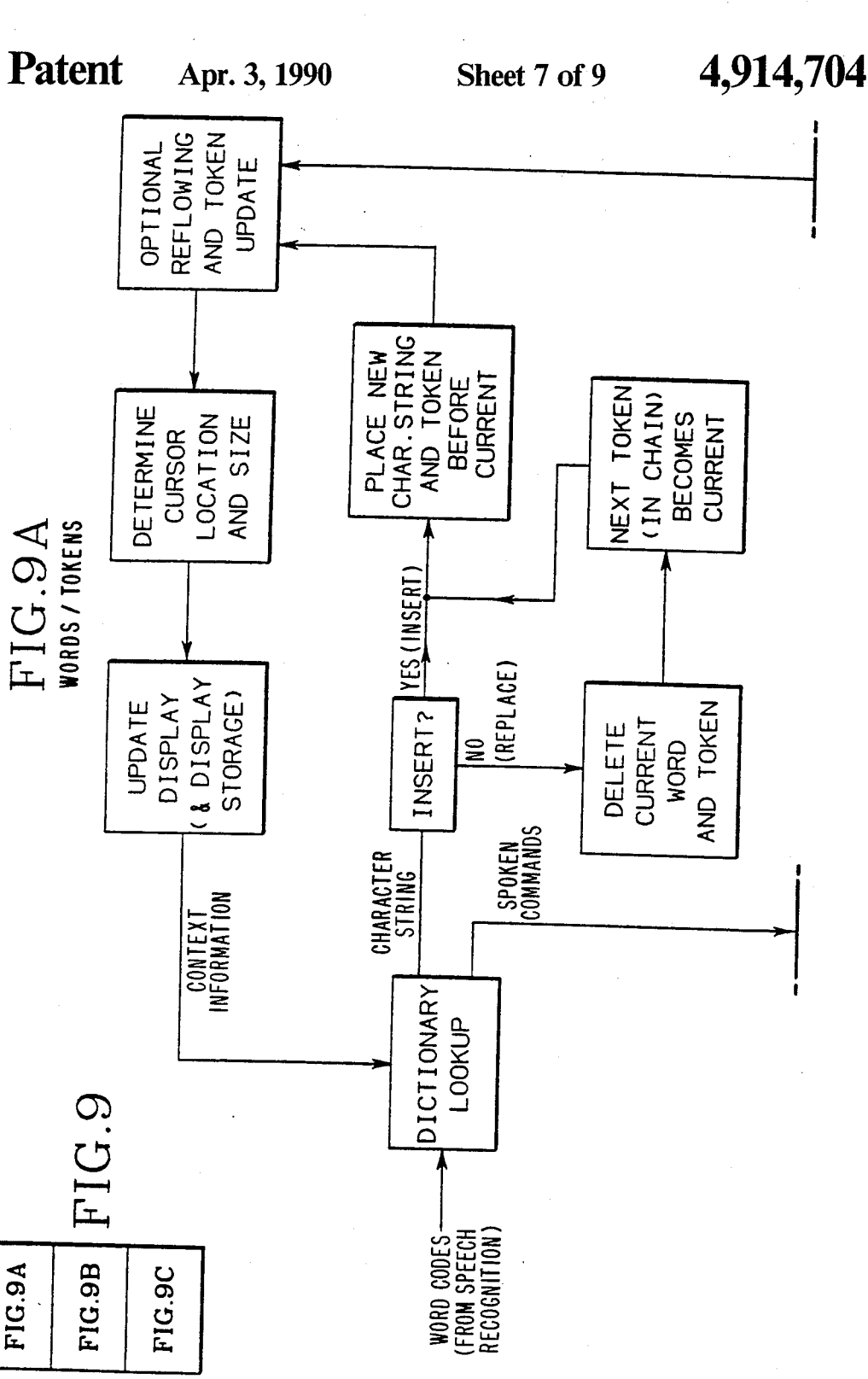
FIG. 9 which is formed of parts 9A, 9B, and 9C is a block diagram of the formatting and editing operations performed in the disclosed speech-input text editor.

(2c) Detailed Procedure for Character String and Token Storage in S&F Section 29 (FIG. 9A)

The following steps are executed for storing the new information:
Buffer new character string and token
Determine mode (INSERT/REPLACE)
If REPLACE:
 # Replace current word in line string buffer by new word; shift right portion of string to make or remove space
 # Replace current token in chained list by new token; insert follower address out of replaced token into new token
 # Transfer next token pointer (follower address) from token list storage into token pointer register
if INSERT:
 # Insert new word before current word in line string buffer (shifting remainder of line to make space) OR insert new word at end of line string in buffer
 # Insert new token in chained list: update follower address in new token, and in preceding token in chain
Executing editing control operations (as listed in Section 2D below)
Reflow lines if current line overflowed (optional)
Update cursor position and length
Update display on screen (2d) Detailed Procedure for Editing Control (FIG. 9B)

The editing control is determined by three categories of information:
(1) The current mode of the system (REPLACE/INSERT—WORDMODE/SPELLMODE);
(2) The current context conditions (given in Table 3);
(3) The last given command (possible spoken commands are listed in Table 1, and possible additional keyed commands are listed in Section (A)6 above).

Figure 9B:
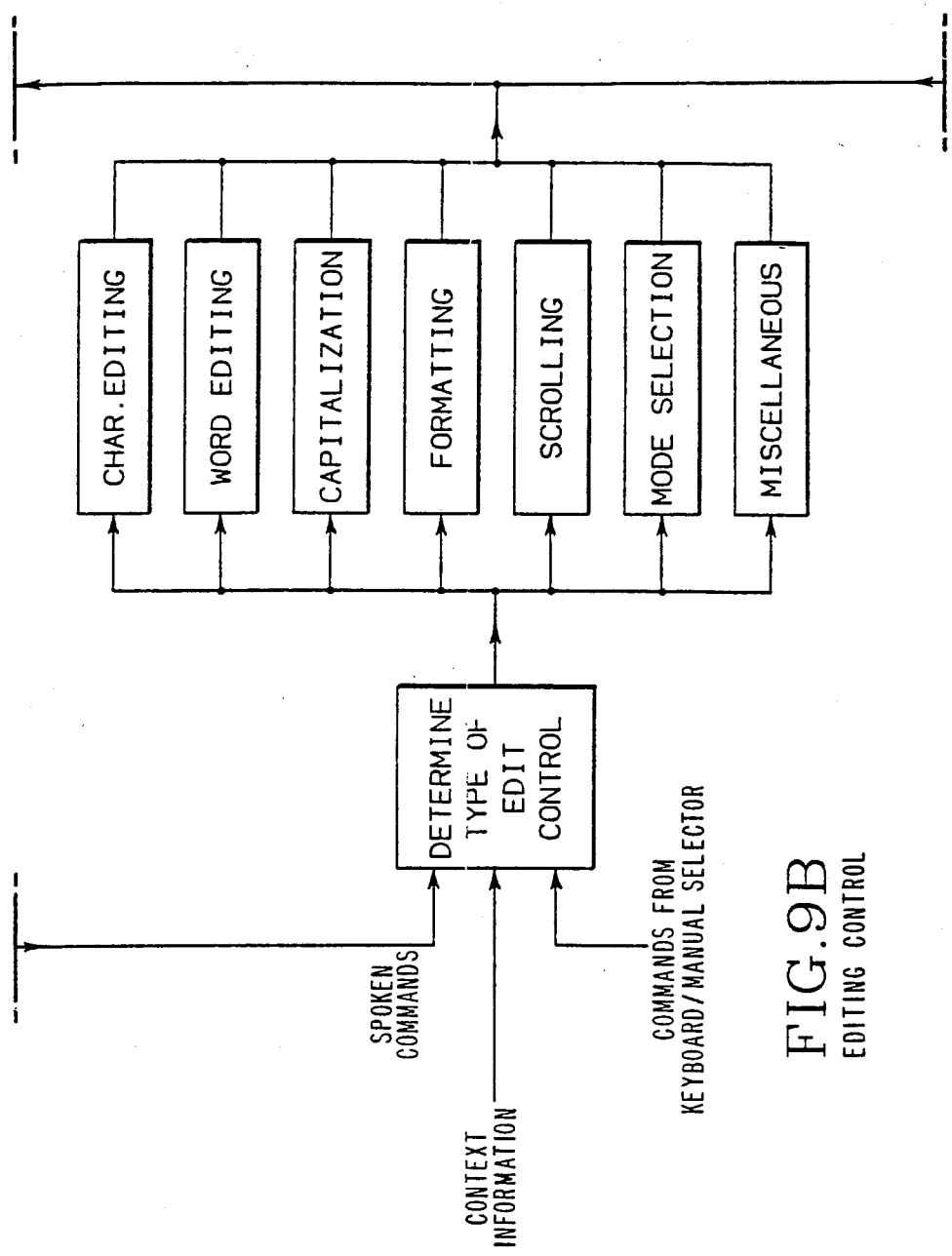

In FIG. 9B, only the more significant categories of editing operations are given: a more detailed listing of all editing operations provided is given in Table 4.

The following survey gives, for the possible combinations of information from the three categories mentioned above, the operations that are executed by the present editing system.

DELETE: If in word mode, the editor deletes the entire word indicated by the cursor box. If in spellmode, the editor deletes only the single character at the cursor position. May also affect surrounding words, as indicated:
(1) If deleted word represents sentence—final punctuation, then the following word (if any) is no longer the beginning of a sentence, and is changed to lowercase (unless it is a word which is normally capitalized, such as "John" or "Mary").
(2) If deleted word is first word of sentence, then the following word becomes the new begin-of-sentence, and must be capitalized.
(3) If deleted word or character is a punctuation mark, then the spacing of remaining items may be affected. For example, if the "/" is deleted in the phrase "and/or", what is left consists of two words with normal spacing, and will be displayed as "and or" rather than "andor".

CHARACTER BACKSPACE: In normal use of editors or word processors with a keyboard, capitalization is very easily entered by pressing a shift key. In the case of spoken input, however, capitalization cannot normally be detected automatically. This problem is addressed by automatic capitalization of the first word in each sentence, as described elsewhere, by default capitalization of words in conformance with normal usage (e.g. "John", "USA"), and by a set of explicit capitalization commands to override these defaults. These explicit commands are:

(1) Capitalize next word. Results in capitalization of next word spoken. For example, speaking "capital example" will produce the output "Example".

(2) Capitalize current word. Capitalizes current word or character indicated by the cursor (in word mode or spellmode, respectively).

(3) Change current word to lower case. Changes current word (or, in spellmode, current character) to lower case, thus overriding default spelling.

(4) Change current word to upper case. Changes current word (or, in spellmode, current character) to upper case. For example, use of this command on the three successive words "John is here" will produce "JOHN IS HERE" as the final result.

Default capitalization or the result of given capitalization commands are reflected for each word in its token (i.e., in the two bits "first capitalized" and "upper case", see FIG. 3).

FORMATTING: Commands such as "new line" and "new paragraph" are used, as is common in text processing systems, to force a new line even though the current line is not full, and to start a new paragraph at the point indicated by the cursor. Within the present editing system, these commands also have the additional effect of causing the next word to be considered as the beginning of a sentence, and so to be capitalized.

SCROLLING: As with other editors, commands are provided to view earlier or later portions of the document. In addition, the present editing system provides a special command to quickly move the cursor to the next word whose recognition is doubtful, where the speaker may either correct the word or leave it, if correct (and cancel its "doubtful" indication). This permits an easy initial proofread of the document for recognition of errors.

MODE SELECTION: Many editors have modes, and provide commands to switch between different operating modes. The editor described here differs in having an extra possibility: word mode or spellmode. As described previously, word mode is appropriate for spoken input, where the input units consist of entire words. Spellmode (or character mode) is appropriate for spelling out words which are not in the recognizer's vocabulary (and thus not in the editor's dictionary), or when using a keyboard. Commands are provided to select the desired mode; this affects the operation of many other commands, as indicated above.

MICROPHONE CONTROL: Although it has not yet been mentioned, it may at times, be desirable to turn off the speech recognizer's microphone, as when answering a telephone call or conversing with a colleague. This capability may be provided most simply by a switch on the microphone itself, or, as in this present editing system, separate commands may be provided to turn the microphone on or off. This latter method avoids the necessity of many separate controls and switches by allowing a uniform command interface to accomplish all desired functions, including microphone control.

DICTIONARY PERSONALIZATION: Since current speech recognition systems have limited vocabularies of at most 5,000-20,000 words, it may occur that a frequently used word is not in the recognized vocabulary. Some recognizers are able to add new words to the legal vocabularies (perhaps also dropping out little used words at the same time). The exact methods for accomplishing this are not part of the present invention, but are rather part of the speech recognizing unit itself. The present editing system does, however, provide a command to add a desired word to the dictionary (17 in FIG. 1) which may be used if the speech recognizer has the capability to add new words to its vocabulary.

The above is not a complete list of editing operations; for those operations which are not relevant for the speech-input nature of the editor no detailed description is given here. These operations include the following:

Mark/unmark an area; move/copy a marked area to another place; delete a marked area.

Search for an indicated word or sequence of characters; replace one such sequence with another.

Scroll backward/forward in, or to top/bottom of, document.

Select insert/replace mode.

Revise existing or create new document; print document; save document

Only when the control procedure of the above list, which is applicable to the respective situation, is executed, are the three steps of the procedure listed above in Section 2c (and shown in FIG. 9A) done (i.e., optional reflowing, cursor updating, and display updating).

Figure 9C:
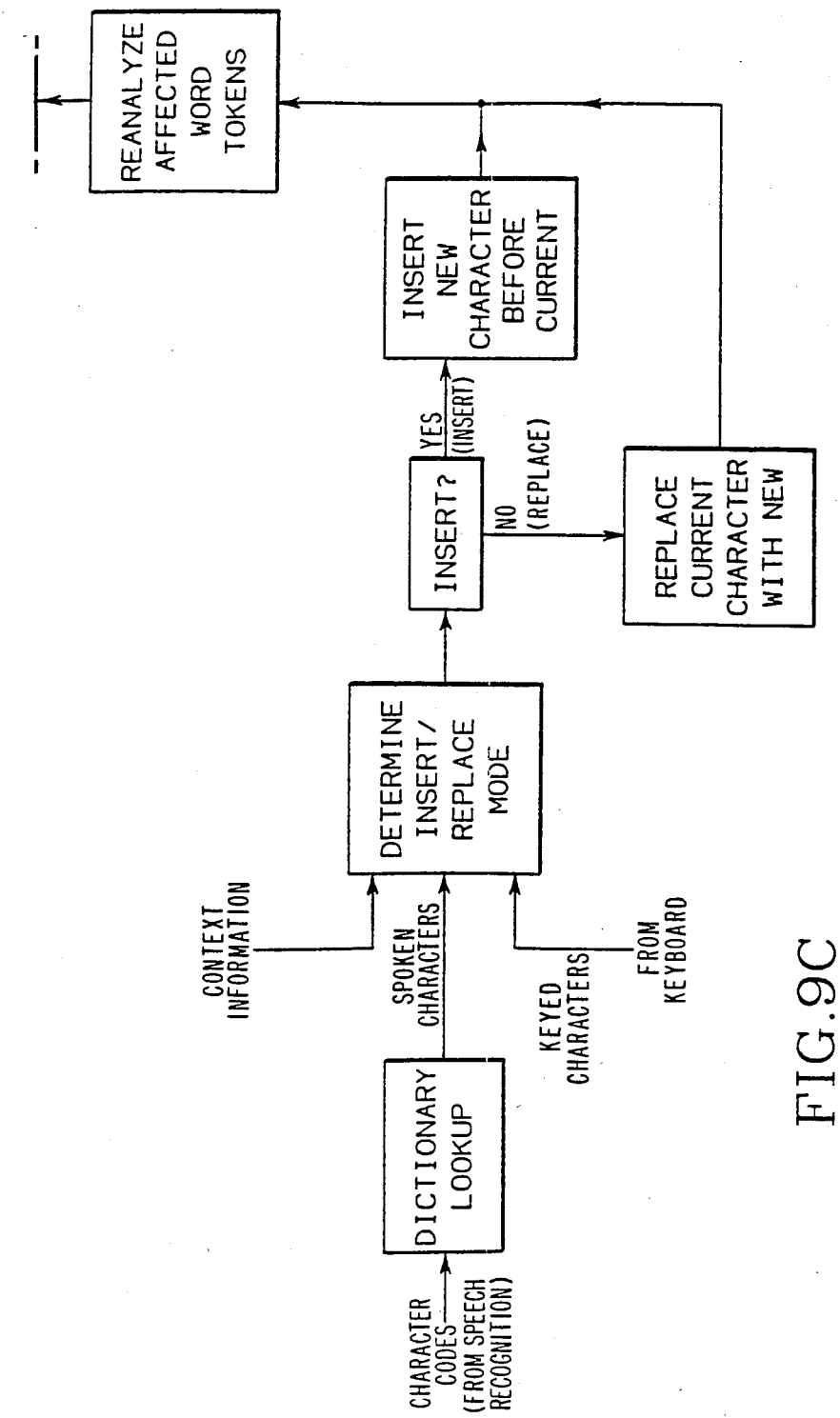

(2e) Detailed Procedure for Storing/Insertion of Single Characters (FIG. 9C)

As was mentioned earlier, in SPELLMODE, single characters can be inserted or replaced in the text edited on the screen. Single characters, when spoken, will be recognized by the speech recognizing device and a respective code identifier is issued. Referring to FIG. 1, this code identifier will be furnished by the speech recognizer section 11A over line 13A to a dictionary section 17A. The dictionary section 17A will issue a single byte representing the respective character on line 27 to the storing and formatting section (S&F) 29. No token will be issued in this mode (contrary to WORDMODE where a token is issued for each word).

In SPELLMODE, the S&F section 29 may also receive single bytes representing individual characters from keyboard 37 (if it is equipped with normal typewriter keys, as would normally be the case).

It should be noted that upon a change from WORD-MODE to SPELLMODE, the cursor is adjusted to be only one character position wide, and it will be positioned in the first character of the word that was the current word when mode changed. Cursor movements will then be in steps of single character positions. Contents of the cursor register (73) will thus be the actual cursor position in the first field, and a "1" in the second field.

After reception of a byte representing a single character, the following steps will be done in the S&F section 29:

Buffer new byte

Determine mode (INSERT/REPLACE); without specific command (i.e., by default), mode will be REPLACE if a cursor is on a letter, and it will be INSERT if cursor is on a space.

If REPLACE:

\# Replace current character byte by new character byte in line string buffer; if replaced character was first character of a word, the new character byte is marked to indicate the word beginning.

If INSERT:

Insert new character byte before current character byte in line string buffer (shifting line portion right of new character to right by one character position).

Reanalyze affected word tokens.

Update cursor position (cursor moves one position right in REPLACE and INSERT modes).

Update display on screen 31 from new and updated information in S&F section 29.

When the ENDSPELLMODE command is given, the cursor will stay at the word containing the currently active character but will be extended again over the whole word. Cursor position and length will be inserted into the cursor register as explained earlier. It should be noted that when the cursor moves, while in SPELL-MODE, over a word boundary (marked character in line string buffer), then the pointer in the token pointer register is replaced by the next or the preceding follower address from the chained token list, depending on the direction of cursor movement.

The above listed step "Reanalyze affected word tokens" handles the following situations:

Updating character count if additional character is inserted or a character is deleted;

Setting "conditional end of sentence" bit (will be explained in later section);

Adapting concatenation if new character at column j is a blank:

If there is a non-blank character at position j+i, then it is decided that a token starts at column j+1; it is given concatenation type LR.

EXAMPLE: If a blank is inserted before the "while" in the word "worthwhile", the result is two tokens for "worth" and "while", printed as "worth while".

If a token starts at column j−1, then it is given the concatenation type of LR.

EXAMPLE: If a blank is inserted after the "2" in "a 23 count", where the token of "2" has concatenation type LO and the token of "3" has the concatenation type OR (because of context), then the "2" and "3" tokens will be re-marked as normal LR type, and the string will appear as a "2 3 count".

Adapting concatenation if new character at column j is not a blank:

If j−1 or the preceding character is a blank, then a new token starts at column j.

If there is a character at column j−1 which is the start of an entity (e.g., word), then the respective token is given concatenation type LR.

EXAMPLE: If a ")" is inserted after a "(" which has concatenation type LO, then the resulting "( )" will have a single token with concatenation type LR.

If there is a character at column j+1 which is the start of a word, and which is also alphanumeric, then the old token of that word is "swallowed up" by the new token, so that there is now a single token starting at column j.

EXAMPLE: If an "s" is inserted before the word "take", then the result "stake" is considered to be a single word having a single token. However, if the "s" is inserted before a punctuation mark like ":", then the result "s:" is still considered to be two separate entities having two separate tokens.

(2f) Short Review of Actions Required for Inserting and Editing the Sample Sentence of FIG. 8

First, the screen is empty except for the cursor in the left upper corner. Without command, the system is in INSERT mode and WORD mode. Line string storage, token list storage, line string buffer and token pointer register are empty. The line pointer register (7C) contains the address of the available space in line string storage for the first line. The address for the first available token position is inserted in the "token pointer" field of the line string buffer, and the "new line" and "new paragraph" bits are set to "1". The position address of the beginning of the first available field in the line string buffer (C11) is inserted in the cursor register, and a length indication of "1", is provided. The address of the next available location in the token list storage (the follower address) is inserted into the respective field of the first available token position.

When the first word "this" is spoken, a character string and token are issued from dictionary, setting the "beginning of sentence" bit in the token (due to respective feedback information from the S&F section 29). The character string is inserted into the line buffer, positions C11 to C14, marking the first byte as "word begin." The token is inserted into the token list storage, with the follower address that was available in the token buffer.

The cursor position is then changed to the address of character position C15 which is the position after the new word, leaving its length equal to one. The display is then updated to show the first word with a capital letter "T" because it was marked "beginning of sentence", and the cursor appears in the position directly after the word.

When the next word "is" is spoken, its character string and token (without setting the "begin of sentence" bit) are issued from the dictionary portion of element 17. The S&F section 29 will automatically insert a space into position C15 of the line string buffer, and the new character string into the following positions C21 and C22, marking C21 as word begin. The token is inserted into the token list storage at the follower address that was available in the old token. A new follower address is appended to the new token in the token list storage. The cursor is updated to point to position C23, and the display is updated to show also the second word and the cursor of one character length behind it.

A similar procedure is done for each of the following spoken words except for the modifications given below.

The spoken command UPPERCASE will cause the token for the word "sample" to be issued with a set "uppercase" bit, resulting in complete capitalization in the display. When the word "only" is entered into the line string buffer, no space will be automatically inserted after the character byte of the "(" because its token indicates "right concatenation". When the character string "four" is issued, its token will have a set "doubtful" bit because of a respective signal from the speech recognizer 11. This will result in a highlighting (surrounding by a box) of the word "four". After the word "purpose" is spoken, a character string representing five asterisks will be entered into the line string buffer, together with the storing of a normal word token with a character count of five. Of course, a space will be automatically inserted after the preceding "the" because the asterisk sequence has a normal word token. Entering of the right parenthesis after the word "demonstration" does not result in an automatic insertion of space because its token indicated "left concatenation", and the same is true for the period when it is entered into the line string.

After the sentence and punctuation are completely spoken, it appears on the display 31 with the cursor located after the period. When the cursor is moved back by the manual selector 39, it first appears at the period, then at the closing parenthesis, and then the whole word "demonstration" is underlined (cursor). The cursor register then contains the address of the character "d" and the length indication "13". The token register will contain the pointer to the correct token, i.e., the one belonging to the underscored word. Now there are two possibilities for replacing the word "demonstration" by "illustration".

The first way is to give the command REPLACE, making it valid by touching EXECUTE, and then speak the whole word "illustration". This will result in furnishing the respective character string and token from dictionary 17 to S&F 29 for replacing the whole "demonstration" character string and token. Close parenthesis and period will move one step left (because the old word was longer than the new one), and the cursor will be shifted to the close parenthesis.

The other way is to replace the old word by spelling the new one, which would be done, however, only if the word "illustration" is not part of the recognition vocabulary (for which words are stored in the dictionary). The command SPELLMODE would be given, but the command REPLACE need not be given expressly because in spellmode, if the cursor is on an actual character, the system automatically enters REPLACE mode. The cursor will then underline only the character "d". The word "illustration" will then be spoken one character after the other, and each new character (when furnished from the dictionary) replaces one of the old word's characters, whereafter the cursor will move right one position. The token, however, will not yet be changed. At the end, the cursor rests at the "n" of the old word which character, however, has to be eliminated because the new word is one character shorter. When the command ERASE is given, only the one character is eliminated. Close parenthesis plus period will move one position left, and the cursor will stay on the parenthesis (which also means that the pointer to the token of the parenthesis is in the token pointer register because the parenthesis has a word begin mark). If then, the command ENDSPELLMODE is given, the system will update the token of the previous word (which now is "illustration") by changing its character count from 13 to 12.

The same procedures can be used for replacing the incorrect word "four" by the correct "for", and for replacing the asterisks string by the correct word "purpose".

Though the example shown in FIG. 8 occupies several lines, the changing of lines during the editing process was not yet mentioned. A changing of line occurs when the cursor is moved from one line to another, when during entering of text the end-of-line margin is reached, and when a "new line" or "new paragraph" command is given.

Each time a line has to be changed, the current contents of the line string buffer is transferred to line string storage (71), the starting address of the desired new line (or of the next empty line) is entered into the line pointer register (7C), the new line is fetched to the line string buffer (7D), and the pointer to the first token is inserted into the token pointer register (7E). In case of an empty line which has an empty header, the address of the next available token location in the token list buffer would be inserted into the token pointer field of the line string buffer, and into the token pointer register. Thus, with each changing of a line, not only the character string in the line buffer is changed but also another token chain is activated.

(2g) Special Conditions at End of a Sentence

In the example given, no conditional end of sentence occurred. Therefore, it will be now explained briefly. Usually, a period or a colon defines the end of a sentence (resulting in capitalization of the next word). However, sometimes some character follows a period before the sentence is completed, e.g., if a whole sentence is given in quotes ("He said: Yes."). Such a situation is context-analyzed by the editing system, and the conditional "end-of-sentence" which was first assigned to the period is, after appearance of the closing quote, taken away from the period and instead assigned to the quote symbol (by setting its respective control bit to "1"). This is referred to as the "conditional end of sentence" condition.

(D) ADDITIONAL FEATURES OF SPEECH EDITOR (1) Further Editing Functions

In the above description, only those features which are relevant for the invention were described in detail. Of course, many other features known from editing systems can be combined with the invention. Such features include copying and moving text portions (as is shown in Table 4 as was already mentioned in Section (C) 2 above).

(2) Menu-Driven Selections

Another known element of editing systems can also be incorporated in the above described editor: A menu, or several menus, can be provided and called either by a spoken command or by touching a respective key. Further commands or conditions can then be selected by moving the cursor, using the manual selector, to the menu position identifying the desired action (and then causing execution by touching the EXECUTE key). No detailed description of such menu-driven operation is necessary, but it should be noted that all the advantages of the invention, i.e., editing on the basis of full words and context evaluation, using tokens for the separate entities, will be available when menus (and other known editing features) are used.

(3) Entering New Words into Dictionary

As was mentioned above, the dictionary 17 contains a finite number of words (and punctuation symbols and digits), i.e., those which can be identified by the speech recognizing device. Any words not in the dictionary could not be identified because the speech editing system does not know them. When spoken, they cause insertion of a dummy character string which can then easily be replaced by spelling the unidentified word. The speech recognition device can be trained to recognize additional words. Once they are identified, a respective code identifier is assigned thereto. A respective character string and a token are then generated for each new word, and in a one-time updating operation they would be entered into dictionary 17. No other modifications to the full-screen editor would be required.

In addition to the variations and modifications to applicants' disclosed apparatus which have been suggested, many other variations and modifications will be apparent to those skilled in the art, and accordingly, the scope of applicant's invention is not to be construed to be limited to the particular embodiments shown or suggested.

For example, although character strings are shown in parallel with associated tokens, it is also within the scope of the invention to provide the two pieces of information serially with the associated token pieces following a given string—the two pieces of information being separated later.

Provided herewith is an appendix which comprises a sample program listing which effectuates various token-related functions.

In addition to the variations and modifications to applicant's disclosed apparatus which have been suggested, many other variations and modifications will be apparent to those skilled in the art, and accordingly, the scope of applicant's invention is not to be construed to be limited to the particular embodiments shown or suggested.

TABLE 1
SPOKEN COMMANDS

| | |
|---|---|
| INSERT | Starts insert mode |
| REPLACE | Starts replace mode |
| ERASE | Deletes current word or character |
| NEWPARAGRAPH | Starts a new paragraph |
| NEWLINE | Forces a new output line |
| CAPITAL | Next word or letter spoken to be capitalized |
| UPPERCASE | Next word to be entirely converted to uppercase |
| SPELLMODE | Starts spelling mode |
| ENDSPELLMODE | Ends spelling mode |

TABLE 2
SPOKEN PUNCTUATION
(and digits and special characters)

| SYMBOL | SPOKEN | CONCAT TYPE |
|---|---|---|
|   | space | 00 |
| / | slash | 00 |
| - | hypen/dash | 00 |
| . | period | OR |
| , | comma | OR |
| : | colon | OR |
| ; | semicolon | OR |
| ? | question-mark | OR |
| ! | exclamation-point | OR |
| ' | apostrophe | OR |
| " | close-quote | OR |
| ) | close-paren | OR |
| " | open-quote | LO |
| ( | open-paren | LO |
| % | percent | LR |
| $ | dollar-sign | LR |
| @ | at-sign | LR |
| # | pound-sign | LR |
| * | asterisk | LR |
| = | equal-sign | LR |
| + | plus-sign | LR |
| 0...9 | zero...nine (DIGITS) | XX (00, LO, OR, LR) |

TABLE 3
CONTEXT CONDITIONS (A) Previous entity is end of sentence.

The current entity may also be end of sentence (if it is, for example, a right parenthesis), or may be beginning of sentence. If beginning of sentence, token should include capitalization.

(B) Previous entity is beginning of sentence.

If previous entity is left quote or left parenthesis, then current entity should also be marked as "beginning of sentence", and capitalized. This allows correct handling of constructs such as the following:

"Look at this" was his comment.

(C) Next entity is beginning of sentence.

If current entity is beginning of sentence (but is not punctuation), and next entity is beginning of sentence, then next entity should no longer be marked as beginning of sentence, and should be changed into lower case (unless normally spelled with capitalized first letter).

(D) Concatenation type of preceding and following entity.

If current entity is one whose spacing depends on context (for example, digits), then the preceding and following tokens are examined to determine spacing.

(E) Spellmode.

TABLE 4
EDITING OPERATIONS

* Character Editing (in Spellmode):
Character Backspace
Insert Character
Replace Character
Delete Character
* Word Editing (in Word Mode):
Insert Word
Replace Word
Delete Word
* Capitalization:
Capitalize Next Word
Capitalize Current Word
Change Current Word to Lowercase
Convert Next Word to All Uppercase
Convert Current Word to All Uppercase
* Formatting:
New Line
New Paragraph
* Scrolling:
Move to Next Highlighted Word (Probable Error)
Scroll Back in Document
Scroll Forward in Document
Scroll to Top of Document
Scroll to Bottom of Document
* Mode Selection:
Select Insert Mode
Select Replace Mode
Select Spell Mode
Select Word Mode
* Miscellaneous
Mark an Area
Unmark an Area
Copy Marked Area to Another Place
Move Marked Area to Another Place
Delete Marked Area
Search for String
Replace One String with Another
Turn Microphone On
Turn Microphone Off
Select Word for Addition to Vocabulary
Print Document
Save Document
Revise Old Document
Create New Document
Erase Document

I claim:

1. A system for editing information from a speech recognizing unit that provides coded identifiers of recognized speech segments, characterized in that the editing system includes:
dictionary and lookup means having inputs comprising said coded identifiers of speech segments each of which represents a word or punctuation word recognized by said speech recognizing unit, wherein said dictionary and lookup means is responsive to each coded identifier of a speech segment, to furnish for a speech segment a respective character string and a token associated with each character string, each token comprising a character count and concatenation indicia, the character count representing the number of characters in the character string, the concatenation indicia representing whether the character string is concatenated to a preceding or following character string, editing means responsive to character strings and tokens furnished by said dictionary and lookup means, for generating formatted data including correct spacing and capitalization, and display means responsive to said formatted data for displaying the speech segments in standards text form.

2. An editing system according to claim 1, characterized in that said editing means comprises:
storing and formatting means for storing
(a) character strings furnished by said dictionary storage means and
(b) the tokens of a previously spoken text being edited,
means for entering commands;
means for inserting, replacing or deleting said stored character strings, and
means for updating the stored tokens in response to said entered commands and in response to insertion, replacement, and deletion of stored character strings.

3. An editing system according to claim 1, characterized in that said speech recognizing unit includes means for recognizing individual characters and furnishing respective character coded identifiers, and in that said dictionary and lookup means is arranged to issue single-character character strings in response to character coded identifiers, and in that said editing means has a command entry means for receiving input commands which selectively switch the editing means between a work mode and a spell mode to enable input and editing selectively either for whole words or single characters.

4. An editing system according to claim 1,
having a speech recognizing unit that is capable of recognizing spoken commands and issuing respective coded identifiers,
the system being further characterized in that said editing means includes control means for receiving editing commands in coded form either from the speech recognizing unit or from a keyboard or from a manual input device.

5. An editing system according to claim 1,
having a speech recognizing unit that issues a special condition indication when a work is not clearly recognized,
said editing means in response to such special condition indication, optically identifying, on the display means, text which the speech recognizing unit does not clearly recognize.

6. An editing system according to claim 1, in which the display means has a cursor function for optically highlighting a stored character string being edited, the system further comprising
means for selectively varying the length of the displayed cursor, the length being determined in response to the character count value in the token associated with the character string being edited.

7. A method of editing spoken input represented in a visual form, in a system comprising a speech recognizing unit furnishing coded identifiers of recognized entities such as spoken words or spoken punctuation marks, the method comprising the step of:
for each said coded identifier of an entity to be represented by a word character string or a punctuation character, furnishing a respective token associated with said each coded identifier, each token indicating whether the work character string or punctuation character is to be concatenated by a space at either or both ends.

8. A method as in claim 7 comprising the further step of:
indicating in each token the number of characters in the character string representing the coded identifier associated with the token, and
in accordance with predefined context rules and in response to a sequence of tokens furnished for successive coded identifiers and respective characters representing the recognized entities in a basic form, generating formatted output data representing the spoken input in a text readable format including spacings.

9. A method according to claim 8, including the further steps of:
providing, for each token, editing control information including a capitalization indication;
storing in a storing and formatting element, all tokens of a file of entities including words and punctuation marks being edited, and
in response to inserting, replacing, or deleting a work character string, updating stored tokens to reflect correctly the required concatenation, capitalization, and character count of successive entities of text.

10. A method according to claim 8, including the further step of:
after occurrence of a punctuation mark, updating the token of the next coded identifier to include an indication for capitalization of the coded identifier.

11. A method according to claim 8, further including the step of:
generating a special code work if a spoken work or punctuation mark cannot be recognized by said recognizing unit, and
in response to the generating of said special code word, generating a special character string and an associated token and displaying a dummy word and storing a token therefor for subsequent editing.

12. In a speech recognition system that generates recognition codes in response to spoken word inputs wherein each of at least some of the recognition codes corresponds to a spoken text word or a spoken punctuation work, a text editor comprising: lookup memory means for assigning a token to each said generated recognition code corresponding to a text word or a punctuation word, wherein each assigned token includes concatenation indicia that indicates how the recognition code to which the token is assigned is permitted to connect to spaces and to other generated recognition codes to which tokens are assigned.

13. In a system as in claim 12 which has a speech recognizing unit which provides a recognition code for each spoken word input, the text editor further comprising:
dictionary storage means which receives each recognition code as an input and ascribes to each recognition code corresponding to a text word or a punctuation word a corresponding string of characters as an output;

each string of characters representing a recognition code to which a token is assigned.

14. In a system as in claim 13 wherein at least some of the code identifiers correspond to editing command spoken inputs, a text editor further comprising:

means for producing a command word in response to a code identifier output corresponding to one of said editing command spoken inputs; and storing and formatting means which receives the produced command word as input and which, in response to the receipt of the produced command word, enters the text editor into an editing mode corresponding to the command word.

15. A text editor as in claim 14 further comprising:

means for indicating the number of characters in each string of characters corresponding to a spoken text word or a spoken punctuation word.

16. A text editor as in claim 15 wherein the string length indicating means includes said lookup memory wherein the tokens generated by said lookup memory include a character count for each string of characters to which a token is assigned.

17. A text editor as in claim 16 wherein said storing and formatting means includes:

means for producing context information based on text words, punctuation words, and commands previously received as recognition codes; and means for directing the context information back to said lookup memory and for updating the tokens assigned to each string of characters.

18. A text editor as in claim 17 further comprising:

means for altering a file after said storing and formatting means enters the text editor into one of the editing modes;

wherein at least some of the alterations in the file result in changes in the context information and in changes in the tokens assigned to respective strings of characters.

19. A text editor as in claim 18 wherein said storing and formatting means includes:

means for providing a text formatted communication output capable of being sensed by a user; and user-controlled means for sending commands to said storing and formatting means;

the user being thereby able to alter the mode of the text editor in response to sensed formatted communication output.

20. A system for recognizing spoken words, the system having editing capabilities and comprising:

a speech recognizing unit which represents each spoken word with a code identifier; and a text editor including:

dictionary storage means for assigning some code identifiers to commands and some code identifiers to respective character strings of text words; and lookup means for assigning a respective token to each character string of a text work, each token including concatenation information indicating whether the character string to which said each token is assigned is to have a space or no space therebefore and thereafter.

21. A system as in claim 20 wherein said dictionary storage means assigns some code identifiers to single characters with which words are spelled and wherein the system further comprises:

storing and formatting means for (a) receiving character strings, command, and single characters from said dictionary means and tokens from said lookup means and (b) generating context information therefrom.

22. A system as in claim 21 wherein said text editor further comprises: means for entering the text editor into a spellmode in which single characters are the spoken inputs;

means for detecting when a code identifier has no command word, character string, or single character corresponding thereto; and means for storing a new word into said dictionary storage means with a corresponding character string and a corresponding token in said lookup means in response to the spelling of the new word character by character after detection of a code identifier which has no command word, character string, or single character corresponding thereto.

* * * * *